United States Patent
Yamauchi et al.

(10) Patent No.: US 6,775,418 B1
(45) Date of Patent: Aug. 10, 2004

(54) IMAGE PROCESSING DEVICE AND PROCESSING METHOD

(75) Inventors: Toshiyuki Yamauchi, Ehime (JP); Kouji Tatsukawa, Ehime (JP); Kouichi Yamazaki, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/701,094

(22) PCT Filed: Mar. 24, 1999

(86) PCT No.: PCT/JP99/01511
§ 371 (c)(1),
(2), (4) Date: Feb. 12, 2001

(87) PCT Pub. No.: WO00/57631
PCT Pub. Date: Sep. 28, 2000

(51) Int. Cl.$^7$ ................................................. G06K 9/42
(52) U.S. Cl. ..................... 382/258; 382/259; 382/266; 382/275; 358/3.26; 358/3.27; 345/611; 345/616; 345/618
(58) Field of Search ................. 382/209, 217, 382/252, 256, 257, 258, 255, 259, 266, 274, 275, 278, 300; 358/1.2, 3.26, 3.27; 345/611, 614, 616, 618

(56) References Cited

U.S. PATENT DOCUMENTS

| | | | | |
|---|---|---|---|---|
| 5,224,179 A | * | 6/1993 | Denker et al. ............... 382/259 |
| 5,272,763 A | * | 12/1993 | Maruyama et al. ......... 382/147 |
| 5,420,937 A | * | 5/1995 | Davis .......................... 382/125 |
| 5,493,621 A | * | 2/1996 | Matsumura .................. 382/125 |
| 5,650,828 A | * | 7/1997 | Lee .............................. 348/625 |
| 5,875,225 A | * | 2/1999 | Wallschlaeger .............. 378/15 |
| 6,058,219 A | * | 5/2000 | Partridge .................... 382/259 |

FOREIGN PATENT DOCUMENTS

| | | |
|---|---|---|
| JP | 61-280944 | 12/1986 |
| JP | 01-272264 | 10/1989 |
| JP | 04-111677 | 4/1992 |
| JP | 04-127774 | 4/1992 |
| JP | 05-276436 | 10/1993 |
| JP | 07-154642 | 6/1995 |
| JP | 07-162849 | 6/1995 |
| JP | 08/286658 | 11/1996 |

\* cited by examiner

*Primary Examiner*—Bhavesh M. Mehta
*Assistant Examiner*—Yosef Kassa
(74) *Attorney, Agent, or Firm*—RatnerPrestia

(57) ABSTRACT

An image processing device detects the correlation between a pixel to be removed in thinning pixel blocks generated by using a delay in horizontal and vertical directions and an adjacent pixel. The device then determines a coefficient corresponding to the correlation. From the pixel to be removed and the adjacent pixel, pixel data is generated by using a predetermined calculation equation. Thinning and reduction of each pixel block in the horizontal and vertical directions thus occurs.

13 Claims, 7 Drawing Sheets

IMAGE PROCESSING DEVICE AND PROCESSING METHOD

THIS APPLICATION IS A U.S. NATIONAL PHASE APPLICATION OF PCT INTERNATIONAL APPLICATION PCT/JP00/01511.

FIELD OF THE INVENTION

The present invention relates to an image processing device and an image processing method, and is particularly characterized by its thinning-out means used in image resolution conversion.

BACKGROUND OF THE INVENTION

Recently, digital-imaging/digital-video equipment, such as a digital still-video camera and DVD, and especially multi-media related equipment among them is rapidly springing into wide use. Also in the field of display devices, dot-matrix displays, such as liquid crystal displays and plasma displays, are becoming widespread. Then, when a number of pixels of image data differs from a number of pixels of a device for displaying it, image processing for adjusting the number of pixels of the image data to those of the display device, i.e. resolution conversion of the image data, is required.

In order to display pictures in a system in which conventional display device having its own number of pixels display picture signal after thinning out some pixels, the method disclosed in Japanese Patent Application Publication No. H05-276436, a technique of detecting correlation between pixels and determining pixels to be thinned out, mean value reducing processing, or the like, has been used. Conventional thinning-out techniques in image processing are described below with reference to the block diagrams shown in FIGS. 5 and 6.

In FIG. 5, delay circuit 51 delays input signal and feeds the delayed pixels into image discriminating circuit 52. Image discriminating circuit 52 detects a correlation of difference between adjacent target pixels, and determines pixels with a smaller difference therebetween as pixels to be thinned out. It also determines if the pixels are a part of characters or a part of a natural image. When the pixels have a correlation of a small difference in gray level, they are determined as a part of a natural image and fed into linear interpolation circuit 53. When the pixels have a correlation of a large difference in gray level, they are determined as a part of characters and fed into adaptive thinning-out circuit 54. The signal thinned out by both processing circuits are reorganized by image reorganizing circuit 55 as an image and sent to respective pixels in a display device and displayed there.

FIG. 6 is a block diagram of a system using mean value reducing processing. Delay circuit 61 delays input signal and feeds the delayed pixels into operation circuit 62. Operation circuit 62 averages the pixel to be thinned out and the pixel adjacent thereto, extracts the pixel at a timing of a thinning-out pulse, and feeds the signal obtained after the thinning-out processing into image reorganizing circuit 63. Image reorganizing circuit 63 reorganizes the picture signal obtained after the thinning-out processing as an image and supplies the data to a display device at a timing corresponding to each pixel in the display device. The signal supplied from image reorganizing circuit 63 are sent to the respective pixels in the display device and displayed there.

FIGS. 7A and 7B show a case where a black-and-white image based on an amount of unit information (pixels) and including patterns of 8 lines and 8 columns is input. They show 8×8 pixels before the thinning-out processing (FIG. 7A), and 6×6 pixels obtained after the system shown in FIG. 6 has performed the thinning-out processing (FIG. 7B). In the 8×8 pixels, those in columns b, c and f, g, and those in lines b, c and f, g are a pixel to be thinned out and a pixel adjacent thereto, respectively, and pixels B and F are produced from the pixels to be thinned out and the pixels adjacent thereto by the mean value reducing processing. In this drawing, display "H" can be read as "H" after the processing. Although the mean value reducing processing has caused no lack of information, it has produced gradation in the part on which it has been performed. It is because the reducing processing has reduced the image by simply adding up the pixel to be thinned out and the pixel adjacent thereto, i.e. those in columns b, c and f, g, and those in lines b, c and f. g, and diving the sum into equal halves to produce converted pixels.

FIGS. 8A and 8B show 4×4 pixels before the thinning-out processing (FIG. 8A) and 3×3 pixels obtained after the system using the mean value reducing processing shown in FIG. 6 has performed thinning-out processing (FIG. 8B). In the case shown in FIGS. 8A and 8B, the pixels to be thinned out and the pixels adjacent thereto, i.e. those in columns b and c and those in lines b and c, respectively, are composed of black and white. The mean value reducing processing cannot represent the original black line and produces an indistinct gray line; thus making the reorganized image more blurred than its original. With this processing technique, the reorganized line is more blurred than that in FIGS. 4A and 4B obtained by the processing method of the present invention described afterwards. With this processing method, lines and texts shown on a screen generally supplied by a computer are quite blurred.

Next, a case where a conventional thinning-out technique is used for a natural image is described. In FIGS. 9A and 9B, thinning-out processing is performed on input picture signal of a natural image by the system using the mean value reducing processing shown in FIG. 6. FIGS. 9A and 9B show input picture signal of a natural image, or the like, with gradation before the thinning-out processing that consist of input signal a, b, c, d, e, f, g, h, i, j, and k arranged in order, and a signal waveform that consists of signal a, B, d, e, f, G, i, j, and k and is obtained after the system using the mean value reducing processing shown in FIG. 6 has reduced five pixels (FIG. 9A) into four pixels (FIG. 9B). The numerical values are given as a guide of signal levels. In FIGS. 9A and 9B, when the mean value reducing processing is performed on pixel b to be thinned out and pixel c adjacent thereto, thinned out pixel B is produced with a signal level of 15 according to (10+20)/2. This thinning-out processing is performed on a portion of the stepped input signal that has a small variation in brightness. The linearity has slightly been lost; however, it is not such a level that causes a problem in the output signal obtained after the processing. Subsequently, when the mean value reducing processing is performed on a pixel g to be thinned out and a pixel h adjacent thereto, thinned out pixel G is produced with a signal level of 50 according to (60+40)/2. This thinning-out processing is performed on the peak of the stepped input signal and the peak of this input signal has been lost. That is, the output waveform after the processing has no edge, thus giving a blurred impression. Therefore, the final image becomes indistinct. This phenomenon is more pronounced as the thinning-out ratio is larger. In the above description, the thinning-out processing in the horizontal direction is described as an example, and in the vertical direction also, similar output signal can be obtained after the processing with completely the same operation, except that the direction in which pixels are thinned out is different.

However, when a natural image is thinned out using the conventional thinning-out processing shown in FIG. 5, image discriminating circuit 52 may make a mistake. If it determines a natural image as a part of characters by mistake, straight and curved lines outlining an object are output as irregular lines; thus a more unnatural image than its original is displayed. When the thinning-out processing is performed on an image composed of characters like texts displayed on a personal computer, the same seen in a natural image holds true. In addition, the conventional system has a problem that the circuitry for thinning out characters, and the like, is complicated, and moreover, a large amount of operations are required for thinning-out processing because thinning out method must be changed according to discrimination result of a natural image or characters.

In addition, the conventional mean value reducing processing shown in FIG. 6 has a problem of generating a blurred image in which gradation is produced in a part having continuous lines, such as characters and graphics.

SUMMARY OF THE INVENTION

An image processing device of the present invention includes: thinning-out instruction means for instructing a pixel to be thinned out; coefficient determining means for detecting correlation between the pixel to be thinned out instructed by the thinning-out instruction means and a pixel adjacent to the pixel to be thinned out, and for determining a coefficient according to the detected correlation; and operation means for producing corrected pixel data using a predetermined operation formula, based on data of the pixel to be thinned out, data of the pixel adjacent to the pixel to be thinned out, and the coefficient determined by the coefficient determining means.

An image processing method of the present invention includes the steps of: instructing a pixel to be thinned out; detecting correlation between the pixel to be thinned out and a pixel adjacent to the pixel to be thinned out; determining coefficients according to the detected correlation; and producing corrected pixel data using a predetermined operation formula according to data of the pixel to be thinned out, data of the pixel adjacent to the pixel to be thinned out, and the determined coefficients.

The image processing device of the present invention determines a pixel B produced by the pixel to be thinned out and the pixel adjacent thereto in a horizontal direction or a vertical direction, in a 4-pixels block consisting of pixels a, b, c, and d arranged in order in the horizontal and vertical directions, using an formula, $(1+2\alpha) \times (Sb+Sc)/2 - Sa \times \alpha - Sd \times \alpha$ that is rewritten from an operation formula using the coefficient $\alpha$ and the signal level of each pixel, $0.5 \times (Sb+Sc) + \alpha \times (Sb-Sa) + \alpha \times (Sc-Sd)$, and reduces the 4-pixels blocks into 3-pixels blocks, each consisting of pixels a, B, and d arranged in order in the horizontal and vertical directions.

With this invention, correlation between the pixel to be thinned out and the pixel adjacent thereto are detected to produce coefficient according to the correlation, and corrected values for the signal levels of the pixels are calculated using a predetermined operation formula with less calculation quantity in the production of a thinned-out binary image or natural image. Therefore, a sharp image close to its original can be displayed with a simple and small circuitry.

In the image processing device of the present coefficient $\alpha$ output from the coefficient determining means is determined by the detection of the difference between two signals or gray levels of the pixel to be thinned out and the pixel adjacent thereto. When the difference in signal or gray level between two pixels is larger than a value predetermined as a discrimination reference value, predetermined coefficient $\alpha$ is output. When the difference in signal or gray level is smaller than the value predetermined as the discrimination reference value, coefficient $\alpha$ is output as 0. The device can provide a sharp image close to its original in the production of a thinned-out binary image.

In the image processing device of the present invention the coefficient $\alpha$ output from the coefficient determining means is determined by the detection of the difference between two signal levels or gray levels of the pixel to be thinned out and the pixel adjacent thereto, and the difference between two signal levels or gray levels of two pixels is ranked by a plurality of values predetermined as discrimination reference values so that a predetermined coefficient $\alpha$ can be selected from a plurality of values and supplied. The device can provide a sharp image close to its original in the production of a thinned-out natural image.

Moreover, in the image processing device of the present invention the thinning-out pulse generating means supplies thinning-out pulses having a width of one pixel or one line to the operation means at regular intervals according to an arbitrary reduction ratio in the horizontal or vertical direction of the image responsive to horizontal and vertical synchronizing signal and pixel clock signal that are input signal. Since the device performs thinning-out processing by generating thinning-out pulses and instructing pixels to be thinned out using a simple structure in the production of a thinned-out image, it can provide a sharp image close to its original.

The image processing device of the present invention includes delay means for delaying an image by every one pixel in a horizontal direction; pulse generating means for generating thinning-out pulses according to a reduction ratio in the horizontal direction; coefficient determining means for detecting correlation between pixels to be thinned out instructed by the thinning-out pulse generating means and pixels adjacent thereto in a plurality of successive pixels obtained by the delay means, and for determining coefficients according the correlation; and operation means for performing computations on the pixels to be thinned out and the pixels adjacent thereto according to the coefficients, and is characterized by producing image data using a predetermined operation formula in the operation means and reducing the image by every one pixel in the horizontal direction.

The image processing device of the present invention includes delay means for delaying the image by every one line in a vertical direction; pulse generating means for generating thinning-out pulses according to a reduction ratio in the vertical direction; coefficient determining means for detecting correlation between the pixels to be thinned out instructed by the thinning-out pulse generating means and the pixels adjacent thereto in a plurality of successive pixels obtained by the delay means, and for determining coefficients according to the correlation; and operation means for performing computations on the pixels to be thinned out and the pixels adjacent thereto according to the coefficients. The device produces image data using the predetermined operation formula in the operation means and reducing the image by every one line in the horizontal direction. Since the correlation between the pixel to be thinned out and the pixel adjacent thereto are detected, and thinning-out processing is performed using coefficients according to the correlation to correct the signal levels of the pixels produced from the pixels to be thinned out and the pixels adjacent thereto, an image processing device capable of displaying a sharp image close to its original can be provided.

In addition, the image processing method of the present invention includes the steps of instructing pixels to be thinned out; detecting correlation between pixels instructed to thin out and pixels adjacent to the pixels instructed to thin out; determining coefficients according to the detected correlation; and producing corrected pixel data using a predetermined operation formula according to data of the pixels instructed to thin out, data of the pixels adjacent to the pixels instructed to thin out, and the determined coefficients. Since this thinning-out processing is performed with corrected signal levels even in binary and natural images, a sharp image close to its original can be provided.

In accordance with the present invention, the image processing device capable of displaying a sharp image closer to its original than conventional devices can be provided because the thinning-out processing is performed with corrected signal levels even in binary and natural images.

DESCRIPTION OF THE PREFERRED EMBODIMENTS

Figure 1:
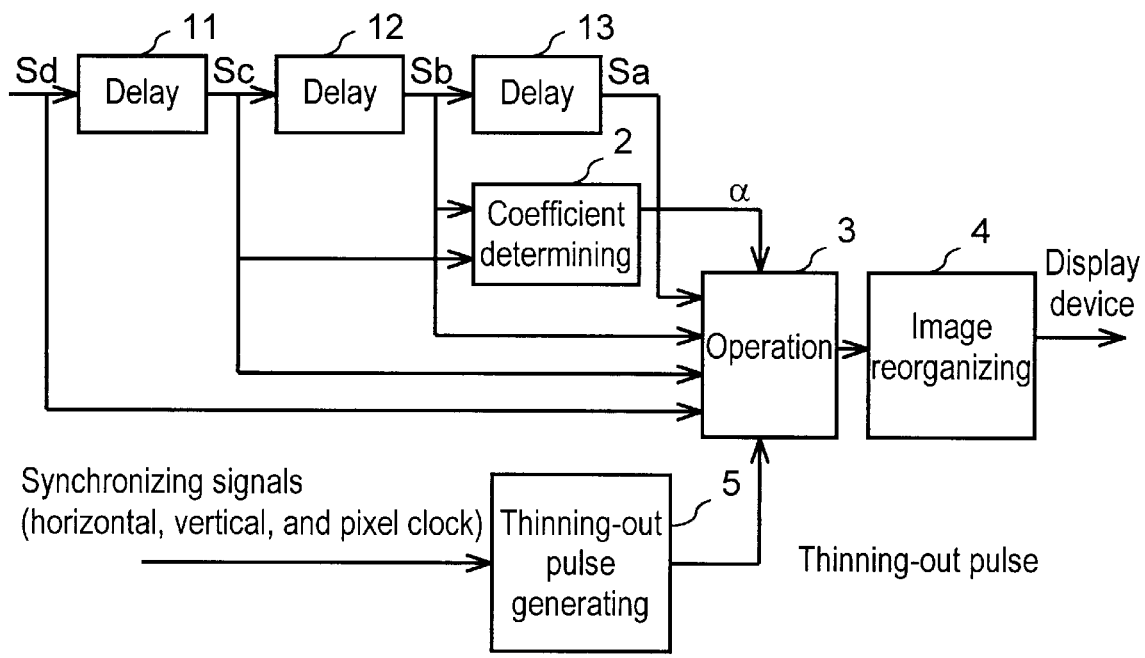
FIG. 1 is a block diagram of an image processing device in accordance with an exemplary embodiment of the present invention.

FIG. 1 shows a block diagram of an image processing device in accordance with the present invention. The device has the same configuration for vertical direction thinning-out and horizontal direction thinning-out; only the delay time of the delay circuits is different in each direction. In FIG. 1, shown by reference numerals 11, 12 and 13 are delay circuits. Each of the delay circuits are composed of a flip-flop and the like, delays input image data by every one pixel when they are thinned out in the horizontal direction and by every one line when thinned out in the vertical direction, and sends the delayed signal to the next circuit. Image data Sd is input into delay circuit 11, and signal Sc delayed by delay circuit 11 is fed into delay circuit 12. Signal Sb delayed by delay circuit 12 is fed into delay circuit 13 and delayed signal Sa is output from delay circuit 13.

Coefficient determining circuit 2 is composed of register, selector, comparator, and the like. Coefficient determining circuit 2 receives signal Sb delayed by delay circuit 12 and signal Sc delayed by delay circuit 11, detects correlation between a pixel to be thinned out and a pixel adjacent thereto, determines coefficient $\alpha$ according to a correlation of difference in signal level or gray level, and supplies them to operation circuit 3.

Operation circuit 3 is composed of selector, register, adder, and the like. Operation circuit 3 receives coefficient $\alpha$ supplied from coefficient determining circuit 2, original signal Sd of the image data, signals Sc, Sb, and Sa supplied from delay circuits 11, 12, and 13, respectively, and thinning-out pulses supplied from thinning-out pulse generating circuit 5, and outputs corrected signal. In other words, operation circuit 3 performs signal level correction based on the pixel to be thinned out and pixels adjacent thereto, and supplies the thinning-out processed signal to image reorganizing circuit 4.

Image reorganizing circuit 4 is a circuit that interpolates a part where pixels are thinned out with the corrected signal supplied from operation circuit 3, and interpolated image data Sout is sent to a display device and displayed there.

Horizontal and vertical synchronizing signal and pixel clock signal are input to thinning-out pulse generating circuit 5. In a thinning-out operation in the horizontal direction, thinning-out pulse generating circuit 5 outputs pulses having a width of one pixel at regular intervals according to an arbitrary reduction ratio in the horizontal direction of the image responsive to the horizontal synchronizing signal as a reference. For example, when an image is reduced to ⅘ using thinning-out processing in the horizontal direction, the thinning-out pulse generating circuit outputs successive pulses each supplied every five pixels. In a thinning-out operation in the vertical direction, thinning-out pulse generating circuit 5 outputs pulses having a width of one line at regular intervals according to an arbitrary reduction ratio in the vertical direction of the image with reference to the vertical synchronizing signal as a standard. For example, when an image is reduced to ⅘ using thinning-out processing in the vertical direction, the thinning-out pulse generating circuit outputs successive pulses each supplied every five lines.

When an image is reduced, operation circuit 3 performs signal level correction, using a signal level correction formula $S=(1+2\alpha)\times(Sb+Sc)/2-Sa\times\alpha-Sd\times\alpha$. This signal level correction allows 4×4 pixels consisting of pixels a, b, c, and d arranged in order in the horizontal and vertical directions in input signal to be thinned out into 3×3 pixels consisting of pixels a, B, and c arranged in order. As for each value in the signal level correction formula in this example, Sa=a, Sb=b, Sc=c, Sd=d and S=B. In this example, a case where b is a pixel to be thinned out, c is a pixel adjacent to the pixel b to be thinned out, and the corrected pixel is B, is described.

Coefficient determining circuit 2 detects such correlation as difference in signal level or difference in gray level between input signals Sb and Sc, and determines coefficient $\alpha$ from the correlation. Operation circuit 3 performs operations on coefficient $\alpha$ and four pixels a, b, c and d, using the above signal level correction formula $B=(1+2\alpha)\times(b+c)/2-a\times\alpha-d\times\alpha$. In this manner, pixel B is produced so that its signal level is corrected using the pixel to be thinned out and the pixel adjacent thereto. For example, when the difference in gray level of correlation between pixel b to be thinned out and pixel c adjacent thereto, is substantially equal, coefficient $\alpha$ is 0. Thus, signal level correction formula S is simply expressed by $B=(b+c)/2$, resulting in simply performing the mean value reducing processing. When a pixel to be thinned out and the pixel adjacent thereto have the correlation of substantially equal difference in gray level, image degradation almost cannot occur even if their mean value is output. When a pixel to be thinned out and a pixel adjacent thereto have the correlation of unequal difference in gray level, coefficient determining circuit 2 detects the difference in gray level stepwise and outputs coefficients $\alpha$ according to the difference. In addition, the detection is performed with a certain allowance as for the detection of the difference in gray level of correlation.

FIGS. 2A through 4B illustrate how the system shown in FIG. 1 performs thinning-out processing on an image having input picture signal consisting of a white background and black characters like texts displayed on a personal computer. As seen from FIG. 2A, input picture signal of only two colors, i.e. black and white, is input before thinning-out processing. Signal level correction is performed in the following manner. When the pixel to be thinned out and the pixel adjacent thereto are of the same color, i.e. having no or a small difference in gray level therebetween, 0 is input to coefficient $\alpha$. When the pixel to be thinned out and the pixel adjacent thereto are different in color, i.e. having a large difference in gray level, 0.5 is input to coefficient $\alpha$. Here the color signal value is assumed to be 0 for a back pixel and 1 for a white pixel.

Figure 2A:
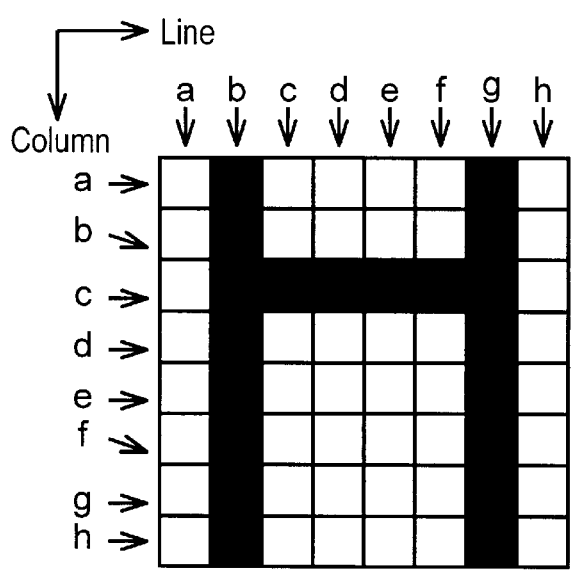
FIGS. 2A and 2B illustrate how the image processing device in accordance with the exemplary embodiment of the present invention thins out 8×8 pixels into 6×6 pixels.
Figure 2B:
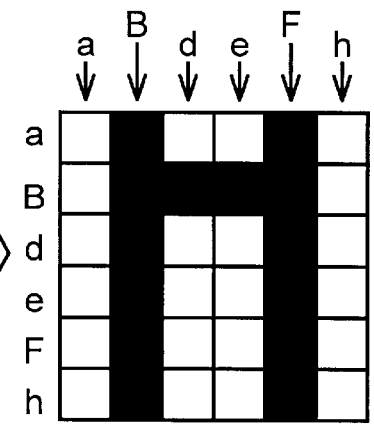

FIGS. 2A and 2B show an example where the system shown in FIG. 1 performs thinning-out processing on a black-and-white image based on an amount of unit information (pixel) and consisting of patterns of 8 lines and 8 columns. Specifically, 8×8 pixels before processing are thinned out by the system shown in FIG. 1 into 6×6 pixels. In this drawing, display "H" can be read as "H" after the processing and it has caused no lack of information. Such processing can be achieved by setting columns b and f in 8×8 pixels as columns to be thinned out, columns c and g as the pixels adjacent thereto, lines b and f as lines to be thinned out, and lines c and g as the pixels adjacent thereto, and performing signal level correction on them. The pixels to be thinned out and those in lines and columns adjacent thereto are substituted into signal level correction formula S to perform signal level correction on the produced pixels. Coefficients $\alpha$ used in signal level correction are determined in coefficient determining circuit 2 by detecting the correlation between the pixels to be thinned out and the pixels adjacent thereto. In the case shown in FIGS. 2A and 2B, since the pixels to be thinned out and the pixels adjacent thereto are composed of black and white and have a large difference in gray level, computation has been performed with coefficient $\alpha$ set to 0.5. When the pixels to be thinned out and the pixels adjacent thereto have no difference in gray level, coefficient $\alpha$ is 0 and thus the mean value reducing processing is simply performed.

Suppose that a pixel, for example, in line b and column c, is referred to as pixel bc, in FIGS. 2A and 2B. Thinning-out is performed on the pixels in columns b, c, f and, g, and those in lines b, c, f, and g in FIG. 2A.

First, columns are described. In line a, pixels in columns a, b, c, and d are input in order into delay circuits 11, 12, and 13 of the system shown in FIG. 1, and delayed there. That is, Sa=aa, Sb=ab, Sc=ac, and Sd=ad. When pixels ac and ab appear in the input and output of delay circuit 12, respectively, a thinning-out pulse is generated by the thinning-out pulse generating circuit and computation is performed. At this time, the difference in gray level of correlation between pixels ac and ab, and then coefficient $\alpha$ is determined in coefficient determining circuit 2. The determined coefficient $\alpha$ is used in operation circuit 3. Since pixel ab is black and pixel ac is white in FIG. 2A, the difference in gray level of correlation between pixels ac and ab is maximum, and thus coefficient $\alpha$ is set to 0.5. Since the color signal value is 0 for a black pixel and 1 for a white one as described above, $\alpha=0.5$, Sa=1, Sb=0, Sc=1, and Sd=1. Operation circuit 3 computes using signal level correction formula S and provides $S=(1+2\times0.5)\times(0+1)/2-1\times0.5-1\times0.5=0$. In image reorganizing circuit 4, a value 0 obtained from the computation, i.e. black, is interpolated in the position where pixels ab and ac have been thinned out.

Next, in line c, Sa=ca, Sb=cb, Sc=cc, and Sd=cd. Since pixels cb and cc are both black, the gray levels of correlation of pixels cb and cc is equal and thus coefficient $\alpha$ is set to 0 in coefficient determining circuit 2. Since the color signal value is 0 for a black pixel and 1 for a white pixel, Sa=1, Sb=0, Sc=0 and Sd=0. Operation circuit 3 performs computations using signal level correction formula S and provides $(1+2\times0)\times(0+0)/2-1\times0-0\times0=0$. This is the same result as obtained by the mean value reducing processing. In image reorganizing circuit 4, a value 0 obtained from the computation, i.e. black, is interpolated in the position where pixels cb and cc have been thinned out. On columns f and g, the same operations are performed.

Next, lines are described. Pixels in columns a, b, c, and d in line a and sequentially, pixels in columns a, b, c, and d in line b are fed in order into delay circuits 11, 12, and 13 in the system shown in FIG. 1, and delayed by every one line there respectively. In column b, Sa=ab, Sb=bb, Sc=cb, and Sd=db. When pixels cb and bb appear in the input and output of delay circuit 12, respectively, a thinning-out pulse is generated by the thinning-out pulse generating circuit and operation is performed. At this time, the difference in gray level of correlation between pixels bb and cb, and then coefficient $\alpha$ are determined. The determined coefficient $\alpha$ is used in operation circuit 3. Since pixels bb and cb in FIG. 2A are both black, the gray levels of correlation of pixels bb and cb is equal, and thus coefficient $\alpha$ is set to 0. As for the color signal values, ab=0, bb=0, cb=0, and db=0, according to FIG. 2A. Operation circuit 3 performs computations using signal level correction formula S and provides (1+2×0)×(0+0)/2−0×0−0×0=0. In image reorganizing circuit 4, a value 0 obtained from the computation, i.e. black, is interpolated in the position where pixels bb and cb have been thinned out.

Next, in column c, Sa=ac, Sb=bc, Sc=cc, and Sd=dc. Since pixel bc is white and pixel cc is black, the difference in gray level of correlation between pixels bc and cc is maximum and thus coefficient α is set to 0.5. As for the color signal values, Sa=1, Sb=1, Sc=0 and Sd=1 according to FIG. 2A. Operation circuit 3 performs computations using signal level correction formula S and provides S=(1+2×0.5)×(1+0)/2−1×0.5−1×0.5=0. In image reorganizing circuit 4, a value 0 obtained from the computation, i.e. black, is interpolated in the position where pixels bc and cc have been thinned out. On lines f and g, the same operations are performed. As mentioned above, the pixels of image data are thinned out and interpolated so that the number of the pixels of the converted image and the total number of the pixels in the display device are the same, and the converted data is displayed on the display device.

Figure 3A:
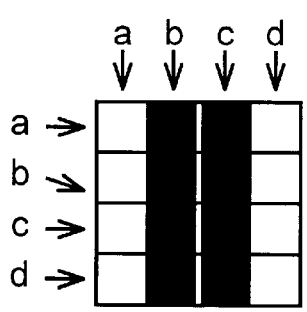
FIGS. 3A and 3B illustrate how the image processing device in accordance with the exemplary embodiment of the present invention thins out 4×4 pixels into 3×3 pixels.
Figure 3B:
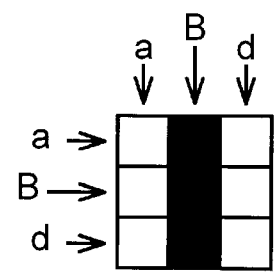
Figure 6:
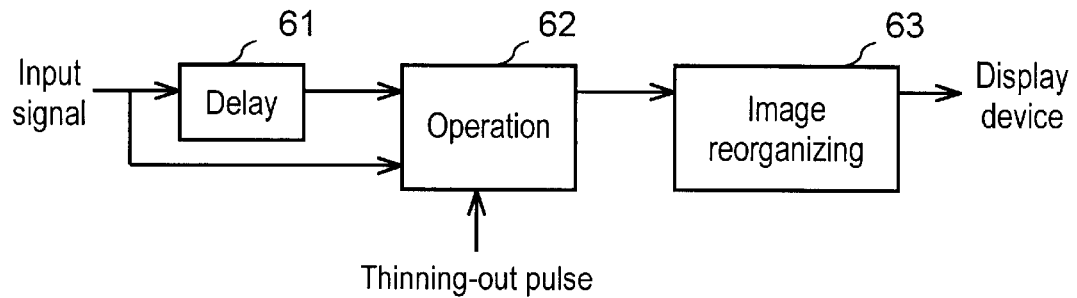
FIG. 6 is a block diagram of an image processing device using conventional mean value reducing processing.
Figure 7A:
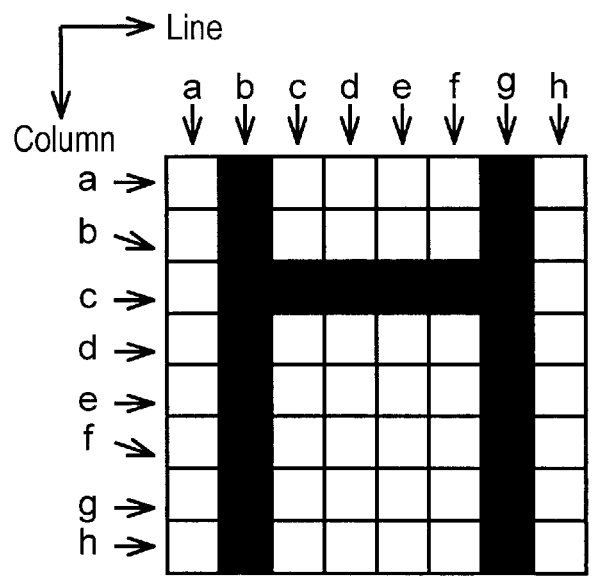
FIGS. 7A and 7B illustrate how the image processing device using the conventional mean value reducing processing thins out 8×8 pixels into 6×6 pixels.
Figure 7B:
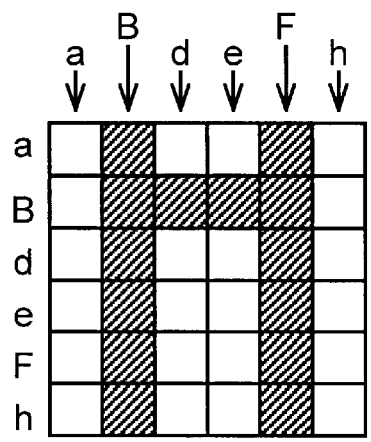

FIGS. 3A and 3B show 4×4 pixels before thinning-out processing, and 3×3 pixels obtained after thinning-out processing using the system shown in FIG. 1. In FIG. 3A, a pixel in column b and line b is set to the pixels to be thinned out, and a pixel in column c and line c is set to those adjacent to the pixels to be thinned out, and then signal level correction is performed on them. Those to be thinned out in column b and those adjacent thereto in column c, i.e. ab, ac, bb, bc, cb, cc, db, and dc, are all black, and thus coefficient α used for the signal level correction is 0. This results in simply performing the mean value reducing processing. Operation formula S is (1+2×0)×(0+0)/2−0×0−0×0=0, and thus the position where the pixels have been thinned out is interpolated by the obtained result 0 (black). As for those in lines b and c, pixels ba, ca, bd, and cd are all white, and pixels bb, bc, cb, and cc are all black, and thus coefficient α used for the signal level correction is 0. This results in simply performing the mean value reducing processing. As described above, in the example shown in FIGS. 3A and 3B, even when 4×4 pixels before thinning-out processing are fed into the circuit using the conventional mean value reducing processing shown in FIG. 6, the same result is obtained.

Figure 4A:
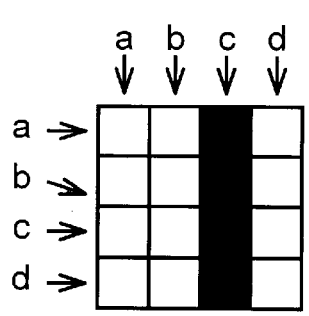
FIGS. 4A and 4B illustrate how the image processing device in accordance with the exemplary embodiment of the present invention thins out 4×4 pixels into 3×3 pixels.
Figure 4B:
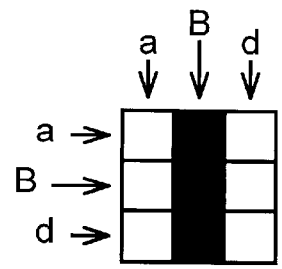
Figure 5:
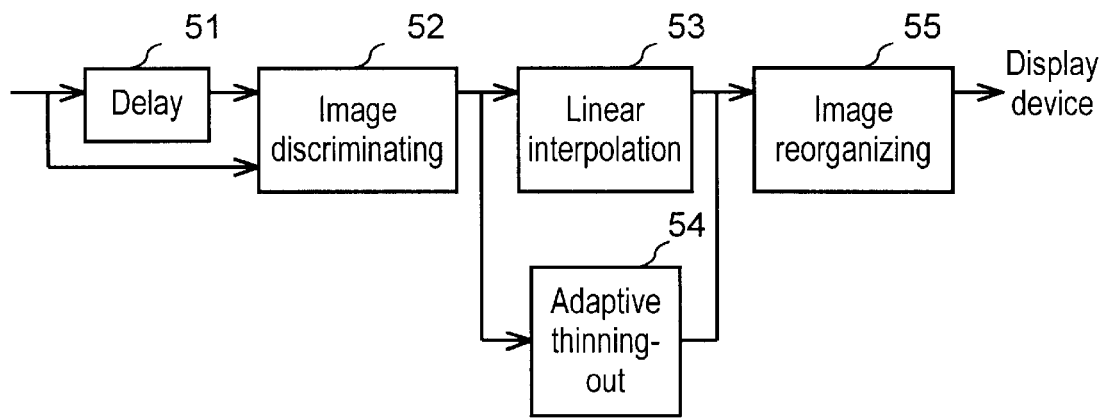
FIG. 5 is a block diagram of an image processing device using a conventional thinning-out technique.
Figure 8A:
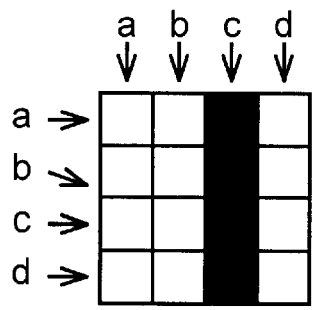
FIGS. 8A and 8B illustrate how the image processing device using the conventional mean value reducing processing thins out 4×4 pixels into 3×3 pixels.
Figure 8B:
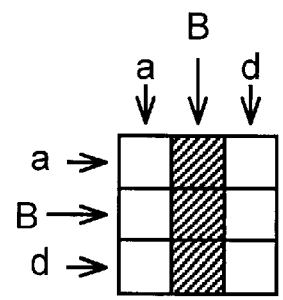
Figure 9A:
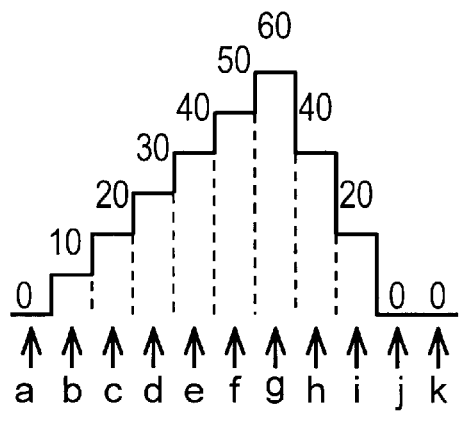
FIGS. 9A and 9B illustrate how the image processing device using the conventional mean value reducing processing thins out 5 pixels into 4 pixels when signal having gradation are input.
Figure 9B:
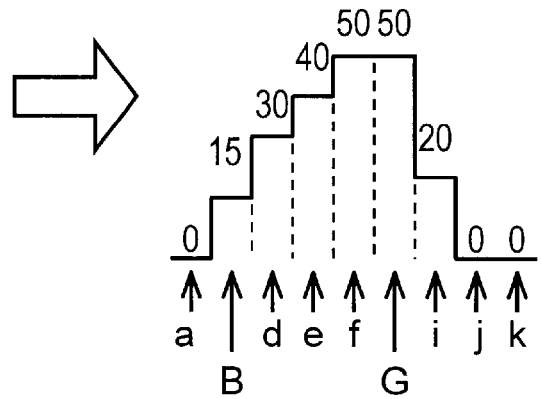

FIGS. 4A and 4B show 4×4 pixels before thinning-out processing, and 3×3 pixels obtained after thinning-out processing using the system shown in FIG. 1. In FIG. 4A, pixels to be thinned out in column b and those adjacent thereto in column c are made of white and black, respectively, and thus coefficient α used for the signal level correction is determined as 0.5. Operation formula S is (1+2×0.5)×(1+0)/2−1×0.5−1×0.5=0, and thus black pixels are interpolated. Since pixels to be thinned out in line b and pixels adjacent thereto in line c are of the same color, pixels of the same color are interpolated after the operation. Consequently, 3×3 pixels obtained after thinning-out processing is as shown in FIG. 4B, which is the same as the image obtained after thinning-out processing as shown in FIG. 3B. For the example shown in FIG. 4A, when 4×4 pixels before thinning-out processing are fed into the circuit using the conventional mean value reducing shown in FIG. 6, a different result in FIG. 8B as described before is obtained.

Figure 10A:
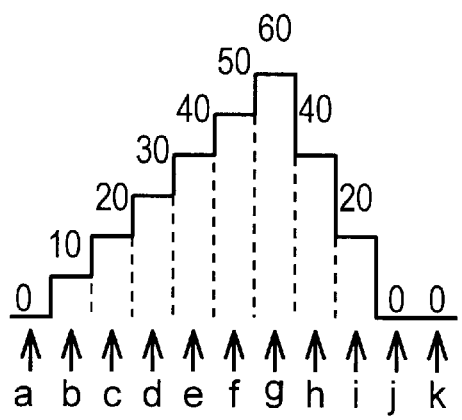
FIGS. 10A and 10B illustrate how the image processing device in accordance with the exemplary embodiment of the present invention thins out 5 pixels into 4 pixels when signal having gradation are input.
Figure 10B:
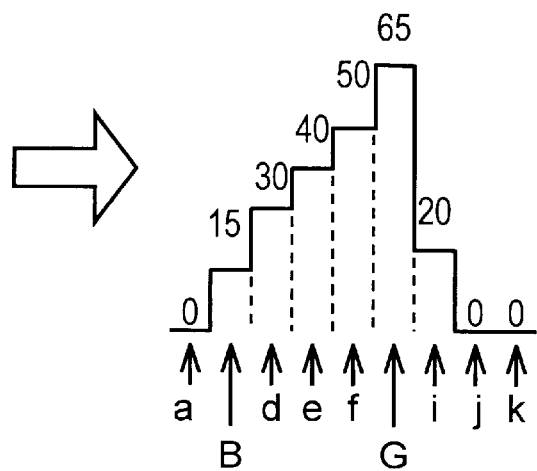

Next, a case where a natural image is thinned out in accordance with the present invention is described. FIGS. 10A and 10B illustrate the case where the system shown in FIG. 1 has performed thinning-out processing on input picture signal of a natural image. The signal level correction is performed in the following manner. In FIG. 1, when a pixel to be thinned out and a pixel adjacent thereto have no or a very small difference in gray level, coefficient determining circuit 2 outputs 0 as coefficient α. When a pixel to be thinned out and a pixel adjacent thereto have a large difference in gray level, the coefficient determining circuit 2 outputs 0.5 as coefficient α. In FIGS. 10A and 10B, the vertical axis shows signal levels, and the horizontal axis shows pixel positions. In FIGS. 10A and 10B, when a pixel to be thinned out and a pixel adjacent thereto differ by 10 or more, for example, in the value of signal level, the difference in gray level is determined as large and coefficient α is set to 0.5. When a pixel to be thinned out and a pixel adjacent thereto differ by less than 10 in the value of signal level, the difference in gray level is determined as small and coefficient α is set to 0.

FIGS. 10A and 10B show input picture signal of a natural image, and the like, with gradation before thinning-out processing that consists of signal a, b, c, d, e, f, g, h, i, j, and k arranged in order, and a signal waveform that consists of signal a, B, d, e, f, G, i, j, and k obtained after the system shown in FIG. 1 has performed thinning-out processing on the image to reduce the signal from 5 pixels to 4 pixels. The numerical values are given as a guide of signal levels. In FIGS. 10A and 10B, since pixel b to be thinned out and pixel c adjacent thereto differ by 10 in the value of signal level, the difference in gray level is determined as large and signal level correction coefficient α is set to 0.5. According to signal level correction formula S, calculated formula B=(1+2×0.5)×(Sb+Sc)/2−0.5×Sa−0.5×Sd is obtained. Substituting the signal level of each pixel into the formula provides S=(1+2×0.5)×(10+20)/2−0.5×0−0.5×30=15. As a result, pixel B is produced by thinning-out processing with a signal level of 15. This value is the same as obtained by thinning-out processing using the mean value reducing processing. Similar to that case, this thinning-out processing is performed on a portion of the stepped input signal that has a small variation in brightness. The linearity has slightly been lost; however, it is not such a level that causes a problem in the output signal obtained after the processing.

Next, pixel g to be thinned out and pixel h adjacent thereto differ by 10 in the value of signal level. Thus, the difference in gray level is determined as large and signal level correction coefficient α is set to 0.5. Calculated formula S=(1+2×0.5)×(Sg+Sh)/2−0.5×Sf−0.5×Si is obtained. Substituting the signal level of each pixel into the formula provides G=(1+2×0.5)×(60+40)/2−0.5×50−0.5×20=65. As a result, pixel G is produced by thinning-out processing with a signal level of 65. In this case, even when the thinning-out processing is performed on the peak of the stepped input signal, the peak of the waveform is maintained or a slight edge enhancement is performed. In other words, even in the output waveform after the thinning-out processing, no degradation is seen in its edge portion and thus a sharp impression is given. Finally, a very clear image is supplied to the display.

In the above examples, thinning-out processing in the horizontal direction is described. For thinning-out processing in the vertical direction, similar output signal can be obtained after the processing with the same operation, except that the direction in which pixels are thinned out is different. In addition, in the above description, coefficient α used for signal level correction is set to 0.5 when a pixel to be thinned out and a pixel adjacent thereto have a large difference in signal and gray levels. When the coefficient α is set to 0.4, the signal level of pixel G produced by thinning-out is obtained by G=(1+2×0.4)×(60+40)/2−0.4×50−0.4×20=62. When the coefficient α is set to 0.3, the signal level of pixel G produced by thinning-out is obtained by G=(1+2×0.3)×(60+40)/2−0.3×50−0.3×20=59. Like these, by selecting an appropriate value according to the correlation between the pixel to be thinned out and the pixel adjacent thereto, fine adjustment can be made on the converted image. For picture input signal of an image composed of characters or drawings without delicate gradation, the optimum coefficient α is 0.5 as described above.

FIGS. 11A, 11B and FIGS. 12A, 12B show input picture signal of an image composed of characters or drawings without delicate gradation before thinning-out processing that consists of signal a, b, c, d, e, f, g, h, i, and j arranged in order, and a signal waveform that consists of signal a, B, d, E, g, H, and j obtained after the system shown in FIG. 1 has performed thinning-out processing on the image to reduce the signal from 3 pixels into 2 pixels. The numerical values are given as a guide of signal levels. In both of FIGS. 11A, 11B and FIGS. 12A, 12B, pairs of a pixel to be thinned out and a pixel adjacent thereto are b-c, e-f, and h-i, and pixels produced after thinning out each pair are B, E, and H. B is obtained by $(1+2\alpha)\times(Sb+Sc)/2-\alpha\times Sa-\alpha\times Sd$, E is obtained by $(1+2\alpha)\times(Se+Sf)/2-\alpha\times Sd-\alpha\times Sg$, and H is obtained by $(1+2\alpha)\times(Sh+Si)/2-\alpha\times Sg-\alpha\times Sj$.

Figure 11A:
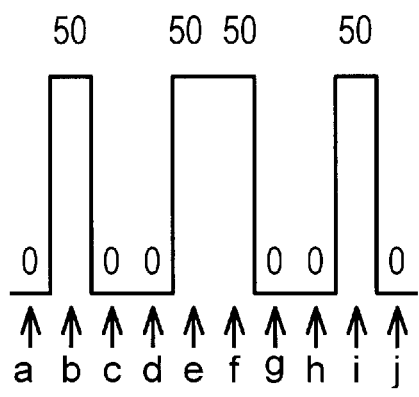
FIGS. 11A and 11B illustrate how the image processing device in accordance with the exemplary embodiment of the present invention thins out 3 pixels into 2 pixels when such signal as characters are input.
Figure 11B:
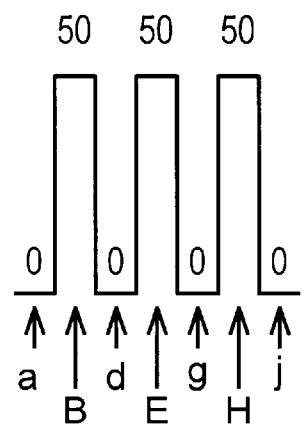

In FIGS. 11A and 11B, signal level correction is performed in the following manner. In the system shown in FIG. 1, when a pixel to be thinned out and a pixel adjacent thereto have no or a very small difference in gray level, 0 is input into coefficient α. To the contrary, when a pixel to be thinned out and a pixel adjacent thereto have a large difference in gray level, 0.5 is input into coefficient α. In FIGS. 11A and 11B, when the pixel to be thinned out and a pixel adjacent thereto differ by 10 or more, for example, in the value of signal level, the difference in gray level is determined as large and coefficient α is set to 0.5. When the pixel to be thinned out and a pixel adjacent thereto differ by less than 10 in the value of signal level, the difference in gray level is determined as small and coefficient α is set to 0.

Figure 12A:
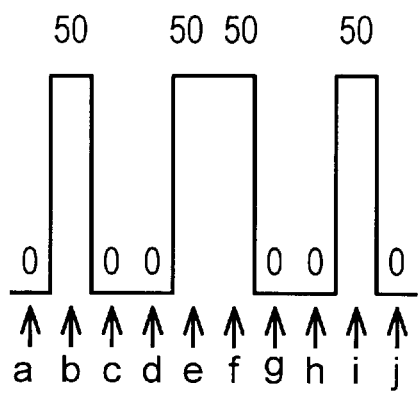
FIGS. 12A and 12B illustrate how the image processing device in accordance with the exemplary embodiment of the present invention thins out 3 pixels into 2 pixels ignoring the detected correlation, when such signal as characters are input.
Figure 12B:
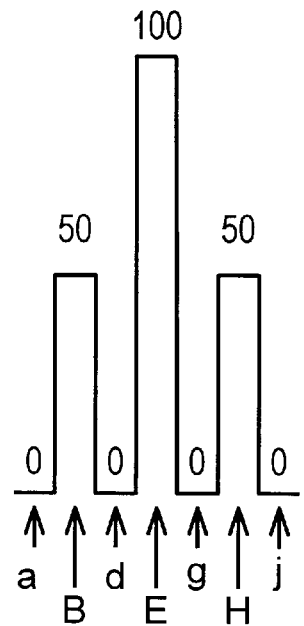

In FIG. 12A and 12B, the system shown in FIG. 1 performs thinning-out processing so as to ignore the correlation between pixels to be thinned out and pixels adjacent thereto and set all the coefficients α to 0.5. When difference in gray level between a pixel to be thinned out and a pixel adjacent thereto is detected to determine coefficients α as shown in FIGS. 11A and 11B, the three peaks of the signal before and after the processing have the same height. Only intervals between each peak and the widths of the peaks are different because the signal has been reduced by thinning-out processing. On the contrary, as shown in FIGS. 12A and 12B, when coefficients α are set to a fixed value without consideration of the difference in gray level between a pixel to be thinned out and a pixel adjacent thereto, the signal level of peak E in the signal after the processing is twice as large as the signal level before the processing. Thus the processed waveform is largely different from that shown in FIG. 11B. When these processed signal are displayed on a display device, the image is unnatural because it has unevenness in brightness in parts like E in FIG. 12B. An image with minimized picture degradation can be displayed as shown in FIGS. 11A and 11B by detecting correlation between a pixel to be thinned out and a pixel adjacent thereto and determining a coefficient according to the correlation.

Figure 13A:
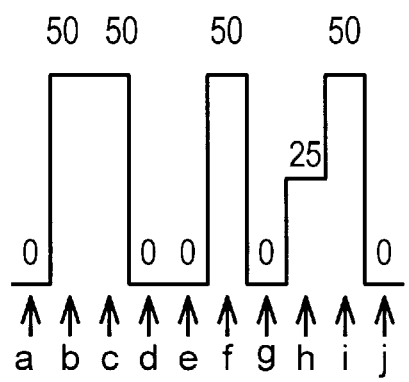
FIGS. 13A and 13B illustrate how the image processing device in accordance with the exemplary embodiment of the present invention thins out 3 pixels into 2 pixels using three coefficients, when such signal as characters having gradation are input.
Figure 13B:
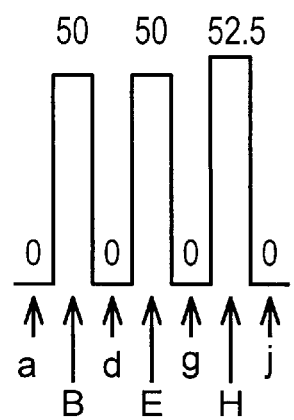
Figure 14A:
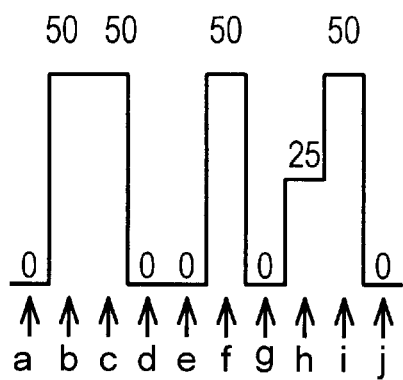
FIGS. 14A and 14B illustrate how the image processing device in accordance with the exemplary embodiment of the present invention thins out 3 pixels into 2 pixels using two coefficients, when such signal as characters having gradation are input.
Figure 14B:
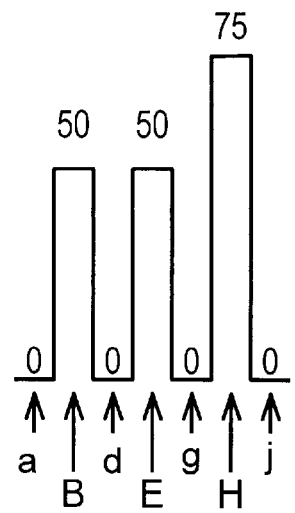

FIGS. 13A and 14A show input picture signal of an image composed of characters or drawings with slight gradation before thinning-out processing that consists of signal a, b, c, d, e, f, g, h, i, and j arranged in order, and FIGS. 13B and 14B show a signal waveform that consists of signal a, B, d, E, g, H and j obtained after the system shown in FIG. 1 has performed thinning-out processing on the image to reduce the signal from 3 pixels into 2 pixels. The numerical values are given as a guide of signal levels. Similar to FIGS. 11A, 11B and FIGS. 12A, 12B, pairs of pixels to be thinned out and pixels adjacent thereto are b-c, e-f, and h-i, and pixels produced after thinning out each pair are B, E, and H. B is obtained by $(1+2\alpha)\times(Sb+Sc)/2-\alpha\times Sa-\alpha\times Sd$, E is obtained by $(1+2\alpha)\times(Se+Sf)/2-\alpha\times Sd-\alpha\times Sg$, and H is obtained by $(1+2\alpha)\times(Sh+Si)/2-\alpha\times Sg-\alpha\times Sj$.

In FIGS. 13A and 13B, signal level correction is performed in the following manner. In the system shown in FIG. 1, when a pixel to be thinned out and a pixel adjacent thereto have no or a very small difference in gray level, 0 is input into coefficient α. When a pixel to be thinned out and a pixel adjacent thereto have a medium difference in gray level, 0.2 is input into coefficient α. When a pixel to be thinned out and a pixel adjacent thereto have a large difference in gray level, 0.5 is input into coefficient α. In FIGS. 13A and 13B, when a pixel to be thinned out and a pixel adjacent thereto differ by 30 or more, for example, in the value of signal level, the difference in gray level is determined as large and coefficient α is set to 0.5. When a pixel to be thinned out and a pixel adjacent thereto differ by 10 or more and less than 30 in the value of signal level, the difference in gray level is determined as medium and coefficient α is set to 0.2. When a pixel to be thinned out and a pixel adjacent thereto differ by less than 10 in the value of signal level, the difference in gray level is determined as small and coefficient α is set to 0.

In FIGS. 14A and 14B, signal level correction is performed in the following manner. In the system shown in FIG. 1, when a pixel to be thinned out and a pixel adjacent thereto have no or a very small difference in gray level, 0 is input into coefficient α. When a pixel to be thinned out and a pixel adjacent thereto have a large difference in gray level, 0.5 is input into coefficient α. In FIGS. 14A and 14B, when a pixel to be thinned out and a pixel adjacent thereto differ by 10 or more, for example, in the value of signal level, the difference in gray level is determined as large and coefficient α is set to 0.5. When a pixel to be thinned out and a pixel adjacent thereto differ by less than 10 in the value of signal level, the difference in gray level is determined as small and coefficient α is set to 0.

Figure 15A:
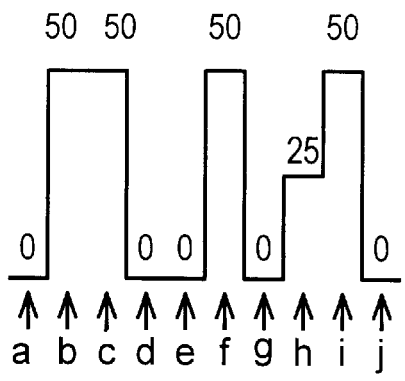
FIGS. 15A and 15B illustrate how the image processing device in accordance with the exemplary embodiment of the present invention thins out 3 pixels into 2 pixels using different two coefficients, when such signal as characters having gradation are input.
Figure 15B:
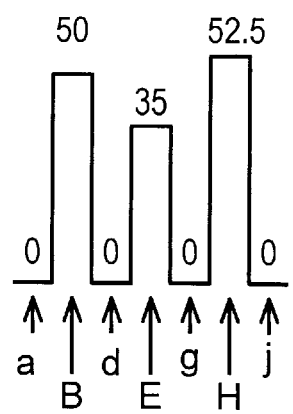

In FIGS. 15A and 15B, signal level correction is performed in the following manner. In the system shown in FIG. 1, when a pixel to be thinned out and a pixel adjacent thereto have no or a very small difference in gray level, 0 is input into coefficient α. When a pixel to be thinned out and a pixel adjacent thereto have a large difference in gray level, 0.2 is input into coefficient α. In FIGS. 14A and 14B, when a pixel to be thinned out and a pixel adjacent thereto differ by 10 or more, for example, in the value of signal level, the difference in gray level is determined as large and coefficient α is set to 0.2. When a pixel to be thinned out and a pixel adjacent thereto differ by less than 10, for example, in the value of signal level, the difference in gray level is determined as small and coefficient α is set to 0. When the difference in gray level between a pixel to be thinned out and a pixel adjacent thereto is detected to determine coefficient α according to the detected difference in gray level as shown in FIGS. 14A, 14B and FIGS. 15A, 15B, there is a slight variation in the height of three peaks of the signal before and after processing. Therefore, when the processed signal is displayed on a display device, the image has slight unevenness in brightness. When the pixels have difference in gray level, the irregularity and unevenness in brightness can be reduced by optimizing coefficient α; however, setting coefficients α using two ranks according to the differences in gray level has some limitations. Then, as shown in FIGS. 13A and 13B, a plurality of ranks are given to the differences in gray level. When coefficients α are set to a plurality of values (two or more), the three peaks of the signal have substantially the same height before and after the processing. Only the intervals between the peaks and the widths of the peaks are different because the signal has been reduced by thinning-out processing. When these processed signal are displayed on a display device, unevenness in brightness hardly occurs.

As described above, picture quality can be improved by determining the differences in gray level according to a plurality of ranks and setting a plurality of (two or more) coefficients α according to the obtained results.

In the above-mentioned examples, the present invention is described with respect to an image processing device implemented as hardware. Needless to say, the present invention can also be implemented as software.

Industrial Applicability

As described above, signal level correction performed on pixels produced by pixels to be thinned out and those adjacent to thereto can minimize the lack of information and degradation of image quality in text and natural images. In addition, using only one operation formula, circuitry smaller than conventional ones can constitute the device. Since correlation between the pixels to be thinned out and pixels adjacent thereto are detected and coefficients according to the correlation are used, a sharp image close to its original can be displayed.

Thinning-out processing using the image processing device of the present invention can prevent the lack of gradation and sharpness of characters not only in a binary image but also in a natural image, and thus a sharp image close to its original can be displayed with a simple structure.

Reference Numerals

2 Coefficient determining circuit
3 Operation circuit
4 Image reorganizing circuit
5 Thinning-out pulse generating circuit
11, 12, 13 Delay circuit

What is claimed is:

1. An image processing device comprising:
  thinning-out instruction means for instructing a pixel to be thinned out;
  coefficient determining means for detecting a detected correlation between the pixel to be thinned out and a pixel adjacent to the pixel to be thinned out, and for determining a coefficient according to the detected correlation;
  operation means for producing corrected pixel data using a predetermined operation formula, based on data relating to the pixel to be thinned out, data relating to the pixel adjacent to the pixel to be thinned out, and the coefficient determined by said coefficient determining means;
  delay means for delaying each pixel block of image data including a plurality of pixels arranged in a horizontal direction and a vertical direction, said delay means delaying pixels in the horizontal direction by every one pixel and delaying pixels in the vertical direction by every one line;
  said thinning-out instruction means for instructing pixels to be thinned out according to a reduction ratio in the horizontal direction and a reduction ratio in the vertical direction;
  said coefficient determining means for detecting correlation between the pixel to be thinned out instructed by said thinning-out instruction means and the pixel adjacent to the pixel to be thinned out, in the pixels delayed by said delay means, and for determining the coefficient according to the detected correlation; and
  said operation means for producing corrected pixel data using a predetermined operation formula, based on data of the pixels to be thinned out, data of the pixel adjacent to the pixel to be thinned out, and the coefficient determined by said coefficient determining means.

2. The image processing device according to claim 1, wherein said each pixel block is a 4-pixels block including pixels a, b, c, and d arranged in order in one of the horizontal direction and the vertical direction, signal levels of each of the pixels are Sa, Sb, Sc and Sd respectively, the coefficient determined by said coefficient determining means is a, the pixel to be thinned out in one of the horizontal direction and the vertical direction is b, the pixel adjacent to the pixel to be thinned out is c, a pixel produced by said operation means is B, said operation formula is $B=(1+2\alpha)\times(Sb+Sc)/2-Sa\times\alpha-Sd\times\alpha$, and said 4-pixels block is reduced to a 3-pixels block including pixels a, B, and d arranged in order.

3. The image processing device according to claim 1, wherein each pixel block is a 3-pixels block including pixels a, b, and c arranged in one of the horizontal and vertical directions selected from pixels a, b, c, and d arranged in one of the horizontal direction and the vertical direction in order, signal levels of each of the pixels are Sa, Sb, Sc and Sd, respectively, the coefficient determined by said coefficient determining means is a, the pixel to be thinned out in one of the horizontal direction and vertical direction is b, the pixel adjacent to the pixel to be thinned out is c, a pixel produced by said operation means is B, said operation formula is $B=(1+2\alpha)\times(Sb+Sc)/2-Sa\times\alpha-Sd\times\alpha$, and said 3-pixels block is reduced to a 2-pixels block including pixels a and B arranged in order.

4. The image processing device according to claim 1, wherein said coefficient determining means detects difference in level between two pixels, i.e. the pixel to be thinned out and the pixel adjacent to the pixel to be thinned out, and selects and determines one of a plurality of coefficients α ranked by a plurality of reference values predetermined as discrimination reference values, according to the detected difference in level.

5. The image processing device according to claim 1, wherein said thinning-out instruction means is thinning-out pulse generation means for generating thinning-out pulses for instructing the pixel to be thinned out according to the reduction ratio in the horizontal direction and the reduction ratio in the vertical direction.

6. The image processing device according to claim 5, wherein said thinning-out pulse generating means
  outputs thinning-out pulses for instructing the pixel to be thinned out at a regular-interval according to the reduction ratio in the horizontal direction responsive to a horizontal synchronizing signal as a reference, when thinning-out processing in the horizontal direction, and
  outputs thinning-out pulses for instructing the pixel to be thinned out at a regular interval according to the reduction ratio in the vertical direction responsive to a vertical synchronizing signal as a reference, when thinning-out processing in the vertical direction.

7. The image processing device according to claim 6, wherein said delay means comprises first delay means for inputting the image data, second delay means for inputting output of said first delay means, and third delay means for inputting output of said second delay means,
  said coefficient determining means inputs the output of said first delay means and the output of said second delay means, and said operation means inputs the image data, the output of said first delay means, the output of said second delay means, output of said third delay means, output of said coefficient determining means, and output of said thinning-out pulse generating means.

8. An image processing device comprising:

delay means to delay each pixel block of image data including a plurality of pixels arranged in a horizontal direction and a vertical direction, said delay means delaying pixels in the horizontal direction by every one pixel and delaying pixels in the vertical direction by every one line;

thinning-out pulse generating means for generating thinning-out pulses according to a reduction ratio in one of the horizontal direction and the vertical direction;

coefficient determining means for detecting correlation between a pixel to be thinned out instructed by the thinning-out pulse generating means and a pixel adjacent pixel to be thinned out, selected from a plurality of successive pixel blocks obtained from said delay means, and for determining a coefficient according to the detected correlation; and operation means for operating on the pixels to be thinned out and the pixels adjacent thereto according to the coefficient;

wherein image data is produced using a predetermined operation formula in said operation means, and thinning-out processing is performed by pixel block in the horizontal direction and the vertical direction to reduce the image.

9. The image processing device according to claim 8, wherein said coefficient is a, pixel B produced by a pixel b to be thinned out and a pixel c adjacent thereto in one of a horizontal direction and a vertical direction in a 4-pixels block including pixels a, b, c, and d arranged in order in one of the horizontal direction and the vertical direction is obtained using a formula of $(1+2\alpha) \times (b+c)/2 - a \times \alpha - d \times \alpha$, and said 4-pixels block is reduced to a 3-pixels block including pixels a, B, and d arranged in order.

10. The image processing device according to claim 8, wherein coefficient $\alpha$ output from said coefficient determining means is determined by detecting difference in one of signal level and gray level between two pixels of the pixel to be thinned out and the pixel adjacent thereto, and coefficient a is output as 0 when said difference in one of the signal level and the gray level between the two pixels is smaller than the value predetermined as the discrimination reference value.

11. The image processing device according to claim 8, wherein the coefficient a output from said coefficient determining means is determined by detecting difference in one of signal level and gray level between two pixels of the pixel to be thinned out and the pixel adjacent thereto, and the coefficient a is selected and determined from one of a plurality of coefficients a ranked by a plurality of reference values predetermined as discrimination reference values, according to the detected difference in one of signal level and gray level between the two pixels of the pixel to be thinned out and the pixel adjacent thereto.

12. The image processing device according to claim 8 comprising:

delay means for delaying an image by every one pixel in a horizontal direction;

thinning-out pulse generating means for generating thinning-out pulses according to a reduction ratio in the horizontal direction;

coefficient determining means for detecting correlation between the pixel to be thinned-out instructed by said thinning-out pulse generating means and the pixel adjacent thereto from a plurality of successive pixels obtained using said delay means, and for determining a coefficient according to the detected correlation; and operation means for operating on the pixel to be thinned out and the pixel adjacent thereto according to the coefficient;

wherein image data is produced using a predetermined operation formula in said operation means and thinning-out processing is performed by pixel in the horizontal direction to reduce the image;

delay means for delaying the image by every one line in a vertical direction;

thinning-out pulse generating means for generating thinning-out pulses according to a reduction ratio in the vertical direction;

coefficient determining means for detecting correlation between the pixel to be thinned-out instructed by said thinning-out pulse generating means and the pixel adjacent thereto from a plurality of successive pixels obtained using said delay means, and for determining coefficient according to the detected correlation; and operation means for operating on the pixel to be thinned out and the pixel adjacent thereto according to the coefficient;

wherein an image data is produced using the predetermined operation formula in said operation means and thinning-out processing is performed by pixel in the vertical direction to reduce the image.

13. An image processing method comprising the steps of:

instructing a pixel to be thinned out;

detecting a detected correlation between the pixel to be thinned out and a pixel adjacent to the pixel to be thinned out;

determining a coefficient according to the detected correlation;

producing corrected pixel data using a predetermined operation formula, at least according to data of the pixel to be thinned out, data of the pixel adjacent to the pixel to be thinned out, and the determined coefficient;

delaying each pixel block of image data including a plurality of pixels arranged in a horizontal direction and a vertical direction so as to delay the pixels in the horizontal direction by every one pixel and the pixels in the vertical direction by every one line;

generating a thinning-out pulse according to a predetermined reduction ratio in one of the horizontal direction and the vertical direction; detecting correlation between the pixel to be thinned out instructed by the thinning-out pulse and the pixel adjacent to the pixel to be thinned out;

determining a coefficient according to the detected correlation; and producing corrected pixel data using a predetermined operation formula, based on at least the determined coefficient, the pixel to be thinned out, and the pixel adjacent to the pixel to be thinned out.

* * * * *